(12) United States Patent
Takahashi et al.

(10) Patent No.: US 12,181,700 B2
(45) Date of Patent: Dec. 31, 2024

(54) OPTICAL FIBER ILLUMINATION DEVICE

(71) Applicant: Sumita Optical Glass, Inc., Saitama (JP)

(72) Inventors: Nobuhito Takahashi, Saitama (JP); Hideaki Takaku, Saitama (JP)

(73) Assignee: Sumita Optical Glass, Inc., Saitama (JP)

( * ) Notice: Subject to any disclaimer, the term of this patent is extended or adjusted under 35 U.S.C. 154(b) by 35 days.

(21) Appl. No.: 17/756,118

(22) PCT Filed: Dec. 1, 2020

(86) PCT No.: PCT/JP2020/044753
§ 371 (c)(1),
(2) Date: May 18, 2022

(87) PCT Pub. No.: WO2021/112103
PCT Pub. Date: Jun. 10, 2021

(65) Prior Publication Data
US 2022/0413202 A1    Dec. 29, 2022

(30) Foreign Application Priority Data

Dec. 3, 2019   (JP) ................................. 2019-218977

(51) Int. Cl.
*F21V 8/00*   (2006.01)
(52) U.S. Cl.
CPC .......... *G02B 6/0006* (2013.01); *G02B 6/001* (2013.01)
(58) Field of Classification Search
CPC .............................. G02B 6/0006; G02B 6/001
(Continued)

(56) References Cited

U.S. PATENT DOCUMENTS

| | | | |
|---|---|---|---|
| 2011/0256523 A1* | 10/2011 | Mendele | G01N 15/1404 435/286.2 |
| 2014/0045250 A1* | 2/2014 | Kreifels | G01N 21/645 435/287.2 |

(Continued)

FOREIGN PATENT DOCUMENTS

| | | |
|---|---|---|
| DE | 102018107523 A1 | 10/2019 |
| EP | 1421428 A2 | 5/2004 |

(Continued)

OTHER PUBLICATIONS

Jun. 13, 2023, Notification of Reasons for Refusal issued by the Japan Patent Office in the corresponding Japanese Patent Application No. 2019-218977.

(Continued)

*Primary Examiner* — Elmito Breval
*Assistant Examiner* — Hana S Featherly
(74) *Attorney, Agent, or Firm* — KENJA IP LAW PC

(57) ABSTRACT

Provided is an optical fiber illumination device in which optical fibers produced without using a special method is used and the amount of light emitted from the side surface is improved. An optical fiber illumination device 1 includes: an optical fiber bundle 10 having a plurality of optical fibers, a resin jacket 101 that covers a bundle of the plurality of optical fibers and emits light, a first end, and a second end, the first end and the second end being polished; and a first light source placed close to the first end so as to emit light in a range of angles larger than an angular aperture of the plurality of optical fibers toward the optical fiber bundle.

6 Claims, 12 Drawing Sheets

(58) Field of Classification Search
USPC .......................................................... 362/554
See application file for complete search history.

(56) References Cited

U.S. PATENT DOCUMENTS

| | | | | |
|---|---|---|---|---|
| 2014/0071691 | A1* | 3/2014 | Ito | F21V 13/10 362/257 |
| 2015/0055915 | A1 | 2/2015 | Logunov et al. | |
| 2017/0315456 | A1* | 11/2017 | Lin | H01S 3/1625 |
| 2019/0094440 | A1* | 3/2019 | Kadokura | A61N 5/0616 |

FOREIGN PATENT DOCUMENTS

| JP | H07211116 A | 8/1995 |
|---|---|---|
| JP | 2011076965 A | 4/2011 |
| JP | 2018063396 A | 4/2018 |
| JP | 2019153590 A | 9/2019 |
| WO | 2010038573 A1 | 4/2010 |

OTHER PUBLICATIONS

May 17, 2022, International Preliminary Report on Patentability issued in the International Patent Application No. PCT/JP2020/044753.
Jan. 12, 2021, International Search Report issued in the International Patent Application No. PCT/JP2020/044753.
Nov. 28, 2023, the Extended European Search Report issued by the European Patent Office in the corresponding European Patent Application No. 20895585.6.
May 28, 2024, Office Action issued by the China National Intellectual Property Administration in the corresponding Chinese Patent Application No. 202080076419.9.

* cited by examiner

OPTICAL FIBER ILLUMINATION DEVICE

CROSS REFERENCE TO RELATED APPLICATION

The present application claims priority to Japanese Patent Application No. 2019-218977 filed on Dec. 3, 2019. The content of the application is incorporated herein by reference in its entirety.

TECHNICAL FIELD

The present disclosure relates to an optical fiber illumination device.

BACKGROUND

Conventionally, optical fiber illumination devices that emit light from the side surface of optical fibers and are used as lighting are known. Optical fibers used in illumination devices each leak, through a cladding, light projected into at least one end of a core in the longitudinal direction. For example, for an optical fiber disclosed in JP 2019-153590 A (PTL 1), a plurality of nano-sized structures are provided inside a core or at the boundary between the core and a cladding, and light is scattered relatively uniformly.

CITATION LIST

Patent Literature

PTL 1: JP 2019-153590 A

SUMMARY

Technical Problem

However, optical fibers including particles that scatter light as with nano-sized structures are hardly produced, since the particles are hardly dispersed appropriately. Accordingly, the optical fibers disclosed in PTL 1 are produced using a special method.

It could therefore be helpful to provide an optical fiber illumination device in which optical fibers produced without using a special method is used and the amount of light emitted from the side surface is improved.

Solution to Problem

An optical fiber illumination device according to one embodiment of the present disclosure includes: an optical fiber bundle having a plurality of optical fibers, a resin jacket that covers a bundle of the plurality of optical fibers and emits light, a first end, and a second end, the first end and the second end being polished; and a first light source placed close to the first end so as to emit light in a range of angles larger than the angular aperture of the plurality of optical fibers toward the optical fiber bundle.

Advantageous Effect

According to some embodiments of the present disclosure, an optical fiber illumination device may be provided in which optical fibers produced without using a special method is used and the amount of light emitted from the side surface is improved.

DETAILED DESCRIPTION

Figure 1:
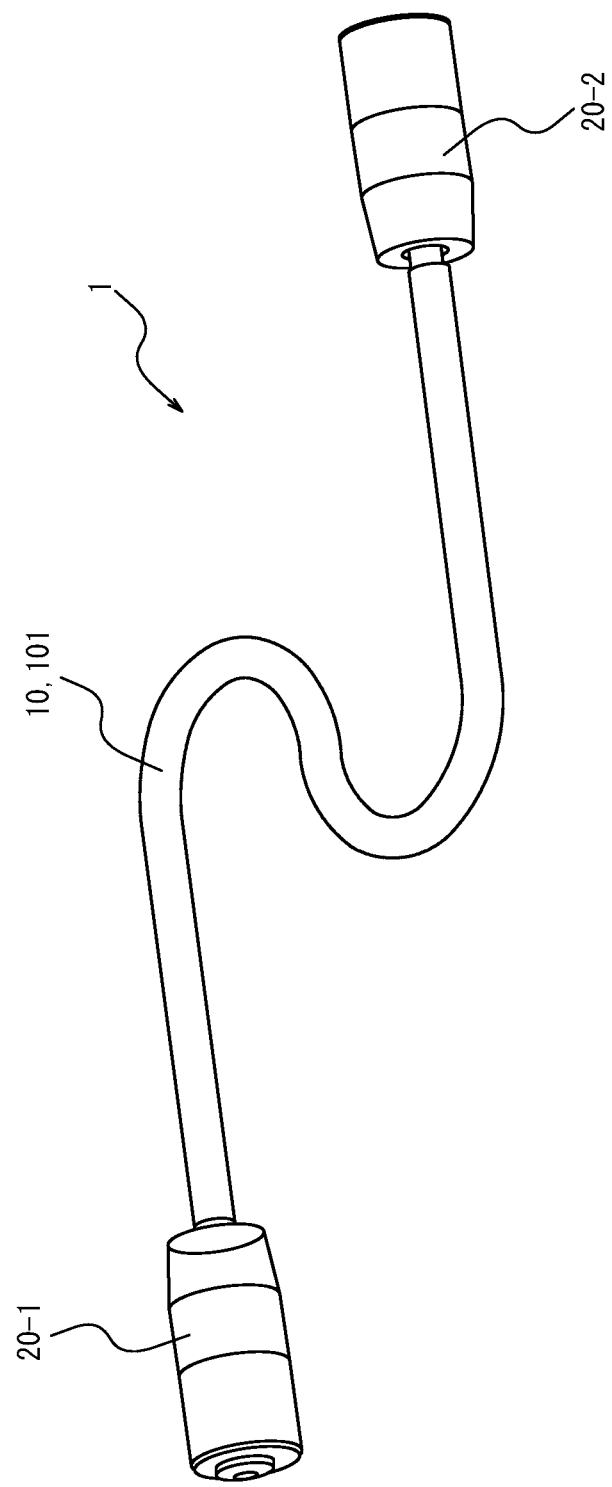
FIG. 1 is a diagram illustrating the appearance of an optical fiber illumination device according to one embodiment.

FIG. 1 is a diagram illustrating the appearance of an optical fiber illumination device 1 according to one embodiment. In appearance, the optical fiber illumination device 1 has an optical fiber bundle 10 covered with a resin jacket 101, a first light input portion 20-1, and a second light input portion 20-2. The resin jacket 101 corresponds to the side surface of the optical fiber bundle 10, and is a portion from which light is emitted. The optical fiber bundle 10 has a first end and a second end opposite to the first end in the longitudinal direction. The first end and the second end are polished. The first end and the second end are for example flat surfaces that are formed into polished optical surfaces. The first light input portion 20-1 and the second light input portion 20-2 project light into the first end and the second end of the optical fiber bundle 10, respectively. The projected light leaks inside the optical fiber bundle 10 and is diffused by the resin jacket 101, thus the side surface of the optical fiber illumination device 1 emits light. The optical fiber illumination device 1 of this embodiment includes the first light input portion 20-1 and the second light input portion 20-2. Alternatively, the optical fiber illumination device 1 may have a structure including only one of the first light input portion 20-1 and the second light input portion 20-2. Further, in this embodiment, the first light input portion 20-1 has the same structure as the second light input portion 20-2. However, the first light input portion 20-1 may have a different structure from the second light input portion 20-2.

Figure 2:
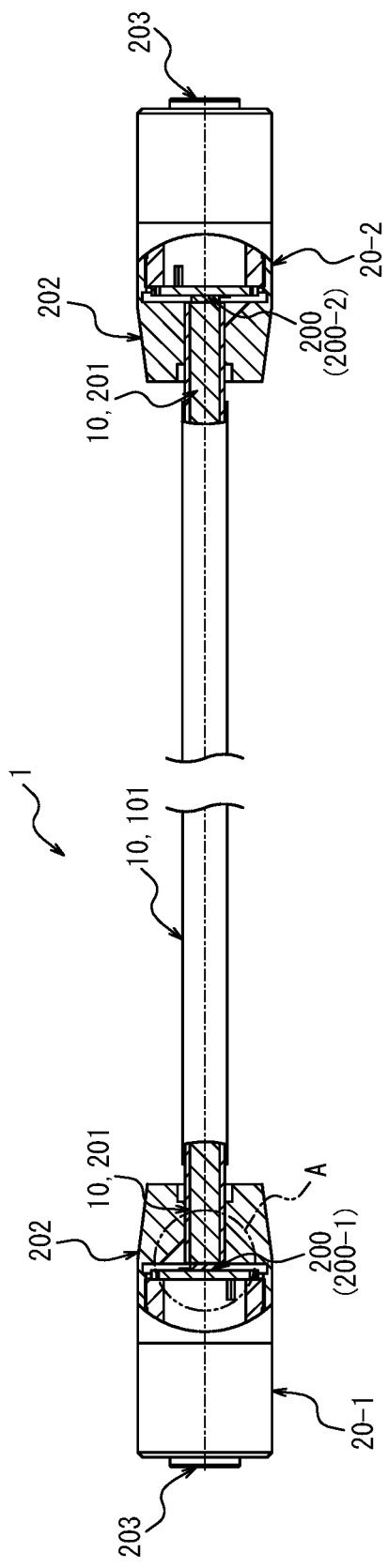
FIG. 2 is a fragmentary cross-sectional view of the optical fiber illumination device of FIG. 1.

FIG. 2 is a fragmentary cross-sectional view of the optical fiber illumination device 1 of this embodiment. The optical fiber bundle 10 has a light emitting portion covered with the resin jacket 101 and light guiding portions that are not covered with the resin jacket 101 and serve as light guides 201. The optical fiber bundle 10 has the light guiding portions near the ends of the optical fiber bundle 10 in the longitudinal direction, with the light emitting portion between the light guiding portions. The first light input portion 20-1 includes a light source 200, a casing 202, and a switch 203. The light source 200 is a source of light projected into the optical fiber bundle 10, and may be, for example, a lamp, an LED, a laser, etc. The light source 200 preferably has a wide luminous intensity distribution profile, that is, diffuses light widely. In this embodiment, the light source 200 is a visible LED. Further, the casing 202 is a component that houses the light source 200, the light guide 201, and a part of the switch 203, and determines the positional relationship between the light source 200 and the light guide 201. The casing 202 may be formed of, for example, resin, metal, etc. In this embodiment, the material of the casing 202 is a resin. The switch 203 is an electronic component for activating the light source 200. In this embodiment, when the switch 203 is turned ON by a user of the optical fiber illumination device 1, the LED of the light source 200 emits light and the light enters the optical fiber bundle 10.

As described above, the second light input portion 20-2 has the same structure as the first light input portion 20-1. Specifically, the second light input portion 20-2 includes a light source 200, a casing 202, and a switch 203 as with the first light input portion 20-1. Here, when the light sources 200 of the first light input portion 20-1 and the second light input portion 20-2 are distinguished, the light source 200 of the first light input portion 20-1 is referred to as a first light source 200-1. Similarly, the light source 200 of the second light input portion 20-2 is referred to as a second light source 200-2.

Figure 3:
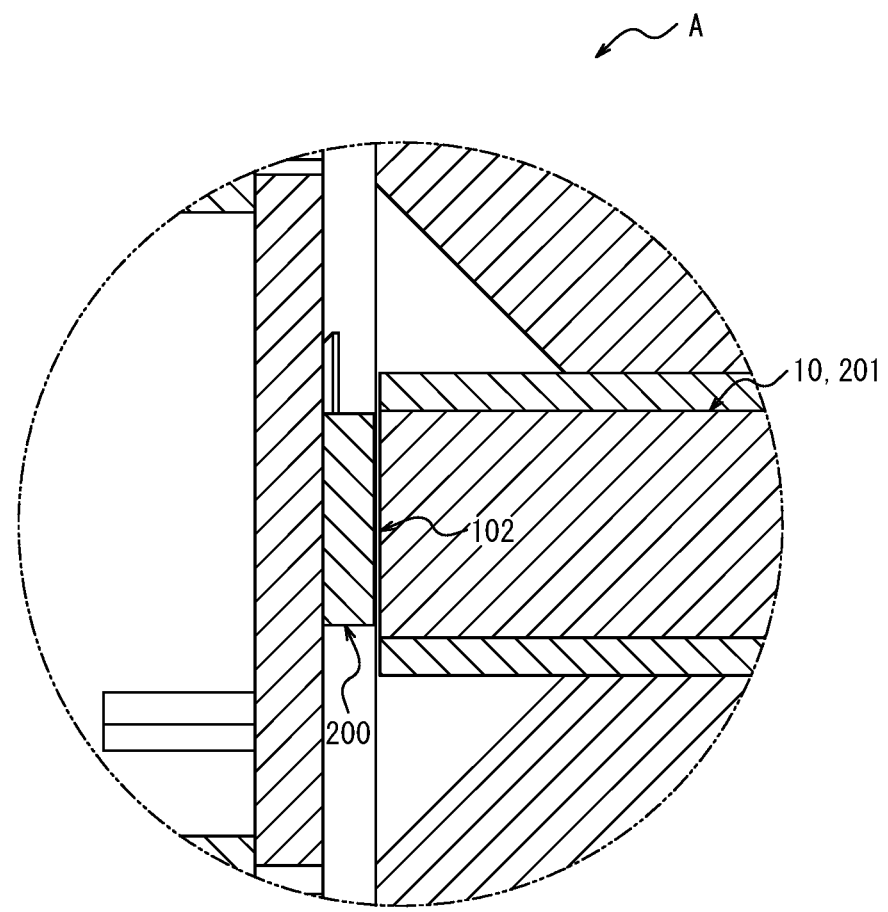
FIG. 3 is an enlarged view of a cross-sectional area A in FIG. 2.

FIG. 3 is an enlarged view of a cross-sectional area A of the first light input portion 20-1 in FIG. 2. In the first light input portion 20-1, the first light source 200-1 is placed close to a first end 102 of the optical fiber bundle 10 with its light emitting surface facing the first end 102. The first light source 200-1 and the light guiding portion of the optical fiber bundle 10 are housed in the casing 202, and the positional relationship between the first light source 200-1 and the first end 102 is retained. Also in the second light input portion 20-2, the second light source 200-2 is placed close to a second end of the optical fiber bundle 10 with its light emitting surface facing the second end. The positional relationship between the second light source 200-2 and the second end of the optical fiber bundle 10 is retained by the casing 202 of the second light input portion 20-2.

Figure 4:
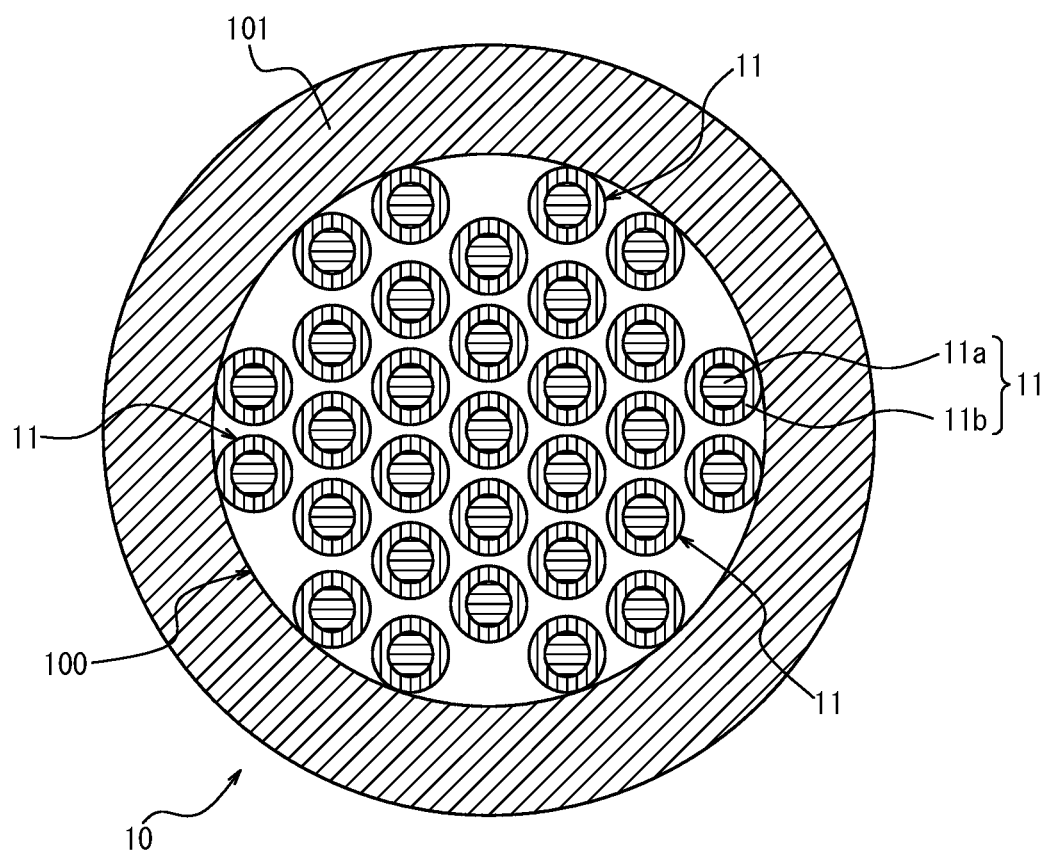
FIG. 4 is a cross-sectional view of an optical fiber bundle.

FIG. 4 is a cross-sectional view of the optical fiber bundle 10. The optical fiber bundle 10 has a buffer 100 and the resin jacket 101 covering the buffer 100 in the sectional view. In the buffer 100, a plurality of optical fibers 11 are held together. In this embodiment, the plurality of optical fibers 11 are covered with the resin jacket 101 that is flexible, with the optical fibers 11 being simply held together at least in the light emitting portion of the optical fiber bundle 10 without being fixed using a fixation agent or the like. Accordingly, the user can easily bend the light emitting portion of the optical fiber illumination device 1. Each of the optical fibers 11 is a single core optical fiber configured to have a core 11a and a cladding 11b covering the outer circumferential surface of the core. In this embodiment, the plurality of optical fibers 11 held together are of one kind and have the same numerical aperture NA. Alternatively, the plurality of optical fibers 11 may have two or more kinds of optical fibers having different numerical apertures NA.

Typically, the numerical aperture NA of the optical fibers 11 can be determined using the following formula (1) where the refractive index of the core 11a is $n_1$ and the refractive index of the cladding 11b is $n_2$ when the optical fibers 11 are surrounded by the air (the refractive index is 1).

$$NA=\sqrt{n_1^2-n_2^2}=\sin\theta \quad (1)$$

When the core 11a and the cladding 11b are made of for example glass, the refractive index $n_1$ of the core 11a and the refractive index $n_2$ of the cladding 11b can be obtained by measurement using the "Measuring Method for Refractive Index of Optical Glass" specified by the Japan Optical Glass Manufacturers' Association.

In formula (1), θ is the acceptance angle of the optical fibers 11. The expression 2θ refers to the angular aperture. As seen from formula (1), when the difference between the refractive index $n_1$ of the core 11a and the refractive index $n_2$ of the cladding 11b is large, the optical fibers have a large numerical aperture NA, receive light in a wide range of angles, and emit light in a wide range of angles. Conversely, when the difference between the refractive index $n_1$ of the core 11a and the refractive index $n_2$ of the cladding 11b is small, the optical fibers have a small numerical aperture NA, receive light in a narrow range of angles, and emit light in a narrow range of angles.

Now, in this embodiment, the optical fibers 11 do not contain particles that scatter light and are not produced using a special method. For example, when the core 11a and the cladding 11b of the optical fibers 11 are made of glass, the optical fiber bundle 10 may be obtained as follows. First, core glass and cladding glass are produced separately. The material of the core glass and the cladding glass is multi-component glass. After that, spinning was performed by the double-crucible method to obtain a single core fiber in which the core glass and the cladding glass covering the core glass are concentric, thereby obtaining the optical fibers 11. The double-crucible method uses a double crucible including two concentric crucibles, one for the cores and the other for the cladding. The core glass and the cladding glass in the crucibles are heated, and the single core fiber is continuously drawn (spun) from a nozzle of the double crucible. After that, the single core fiber is cut into pieces each having a predetermined length in a cleanroom. As illustrated in FIG. 4, approximately 50 to 100000 pieces of the cut single core fiber are held together and are covered with the resin jacket 101, thus the optical fiber bundle 10 is obtained.

The optical fiber bundle 10 produced by a production method as described above is excellent in mass productivity. However, the amount of light emitted from the side surface of the optical fiber bundle 10 obtained as described above is small and is inadequate for lighting applications. Diligent studies were made to seek ways to solve this problem, and it was found when the positional relationship between the light source 200 and the relevant end of the optical fiber bundle 10 satisfies a predetermined relationship in relation to the numerical aperture NA of the optical fibers 11, the amount of light emitted from the side surface is improved. Specifically, the amount of light emitted from the side surface of the optical fiber illumination device 1 of this embodiment can be sufficiently improved when the light source 200 and the relevant end of the optical fiber bundle 10 have the positional relationship described below.

Figure 5:
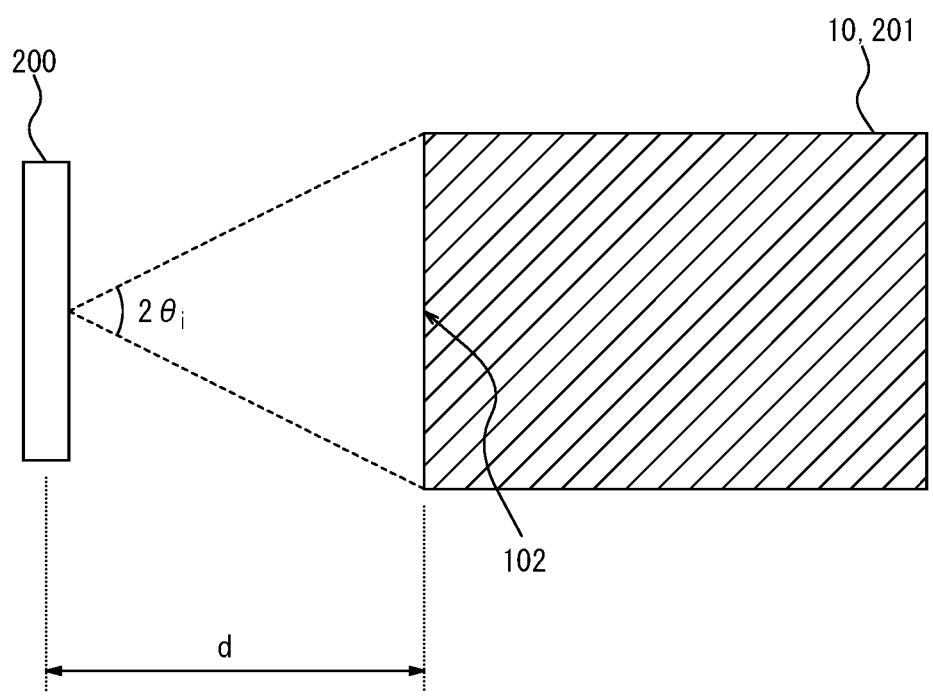
FIG. 5 is a diagram illustrating the distance between a light source and an end of an optical fiber bundle, and the angle of incidence.

FIG. 5 is a diagram illustrating the distance d between the light source 200 and the first end 102 of the optical fiber bundle 10, and the angle of incidence θi of light. When the distance d between the light source 200 and the first end 102 is smaller, the angle of incidence θi of light is larger. Now, FIG. 5 illustrates a case of the first end 102 of the optical fiber bundle 10, but the same relationship applies to between the distance d and the angle of incidence θi of light for the second end.

As described above, the optical fibers 11 forming the optical fiber bundle 10 have a predetermined numerical aperture NA that determines the angular aperture 2θ. When light in a range of angles wider than the angular aperture 2θ enters, part of the light is not transmitted by the optical fibers 11. Conventionally, to increase the transmission efficiency, the angle of incidence θi is typically adjusted to θ or less using a condenser lens. Using a condenser lens corresponds to making the distance d large to some degree without reducing the amount of light.

Figure 6:
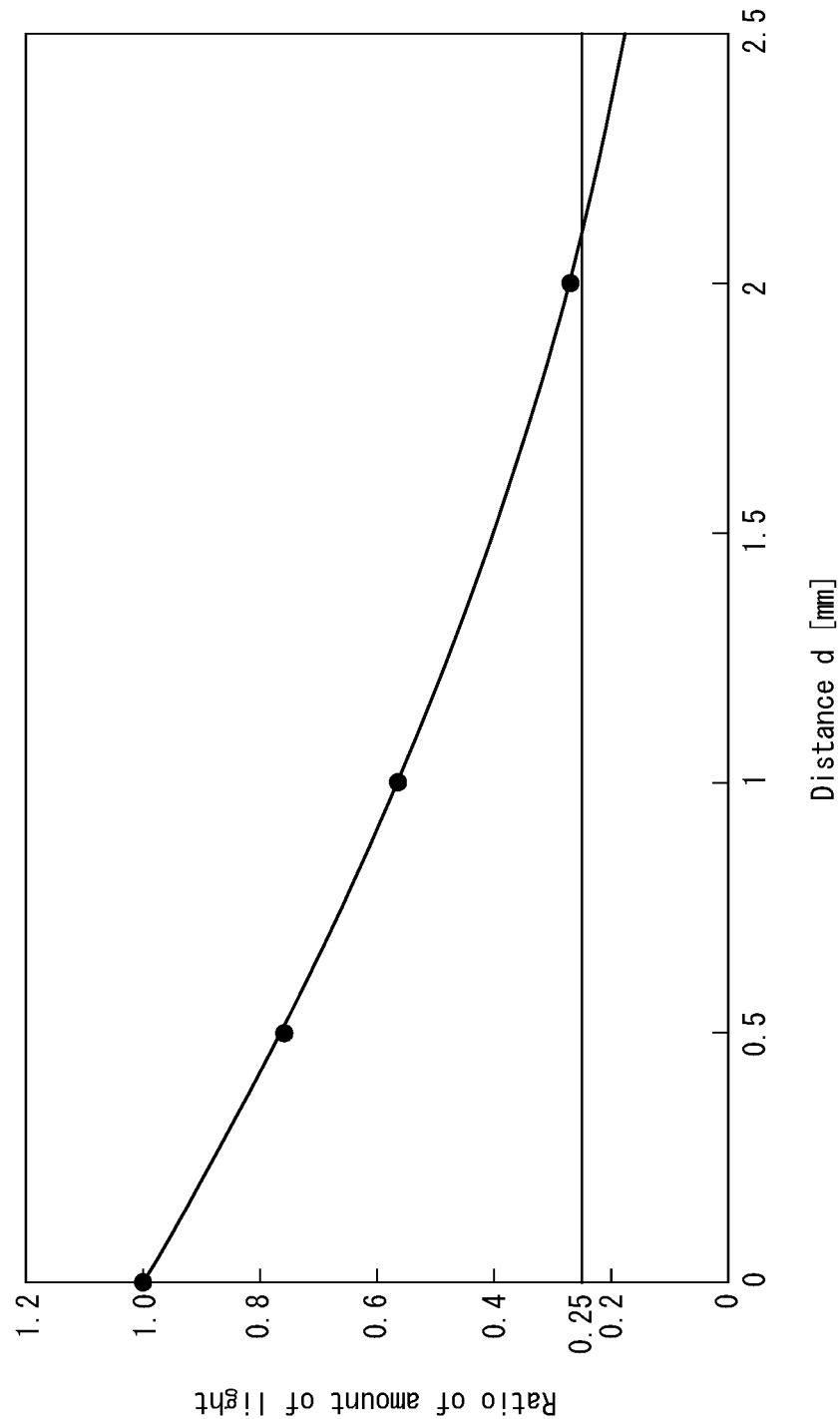
FIG. 6 is a diagram illustrating the relationship between the distance between a light source and an end of an optical fiber bundle, and the ratio of the amount of light.

In the optical fiber illumination device 1 of this embodiment, the first light source 200-1 is placed close to the first end 102 to emit light in a range of angles wider than the angular aperture 2θ of the plurality of the optical fibers 11 toward the optical fiber bundle 10 without the use of a condenser lens. FIG. 6 is a diagram illustrating the amount of light emitted from the side surface of the optical fibers 11 to be described in Example 1 in a case where the distance d between the first light source 200-1 and the first end 102 is changed. The horizontal axis in FIG. 6 represents the distance d between the first light source 200-1 and the first end 102. The vertical axis in FIG. 6 represents the ratio of the amount of light indicating the relative change in the amount of light emitted from the side surface. The ratio of the amount of light on the vertical axis is a proportion such that the amount of light emitted from the side surface is 1 when the first light source 200-1 is in contact with the first end 102 or when the distance d is 0. As illustrated in FIG. 6, as the distance d is higher, the amount of light emitted from the side surface is smaller; accordingly, the light source 200 is preferably placed close to the first end 102. The amount of light emitted from the side surface is preferably larger than ¼ of that in the case where the distance d is 0. Accordingly, "close" means that the distance d is less than 2 mm. More preferably, "close" means that the distance d is less than 1 mm. Still more preferably, "close" means that the distance d is less than 0.5 mm. With a view to preventing a reduction in the amount of light emitted from the side surface, the light source 200 and the relevant end of the optical fiber bundle 10 are most preferably in contact with each other.

Figure 12:
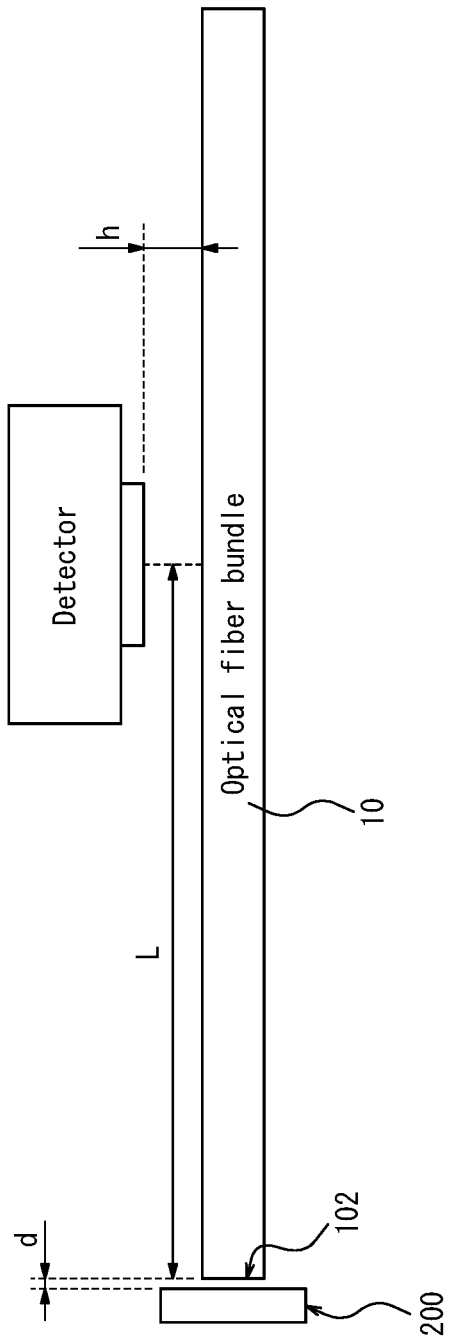
FIG. 12 is a diagram illustrating distance d, distance L, and distance h.

Now, as illustrated in FIG. 12, the distance d in Example 1 was the distance between a light emitting surface (light emitting surface of the LED) of the light source 200 and the first end 102 of the optical fiber bundle 10. If light from the light source 200 enters the optical fiber bundle 10 through a condenser lens, the distance d is the distance between the focal point of the condenser lens and the first end 102 of the optical fiber bundle 10. Further, the distance L is a distance from the first end 102 in the longitudinal direction of the optical fiber bundle 10 (the direction in which the optical fiber bundle 10 extends). Further, the distance h is a distance in a direction perpendicular to the longitudinal direction of the optical fiber bundle 10 from a certain position in the surface of the optical fiber bundle 10. In measuring the amount of light emitted from the side surface in FIG. 6 above, a measurement device (detector) used to measure the amount of light emitted from the side surface is placed away from the optical fiber bundle 10 in a direction perpendicular to the longitudinal direction. In FIG. 6, the distance h to the measurement position is 1.0 mm. The same definitions apply to the distance L and the distance h for the second end.

Figure 7:
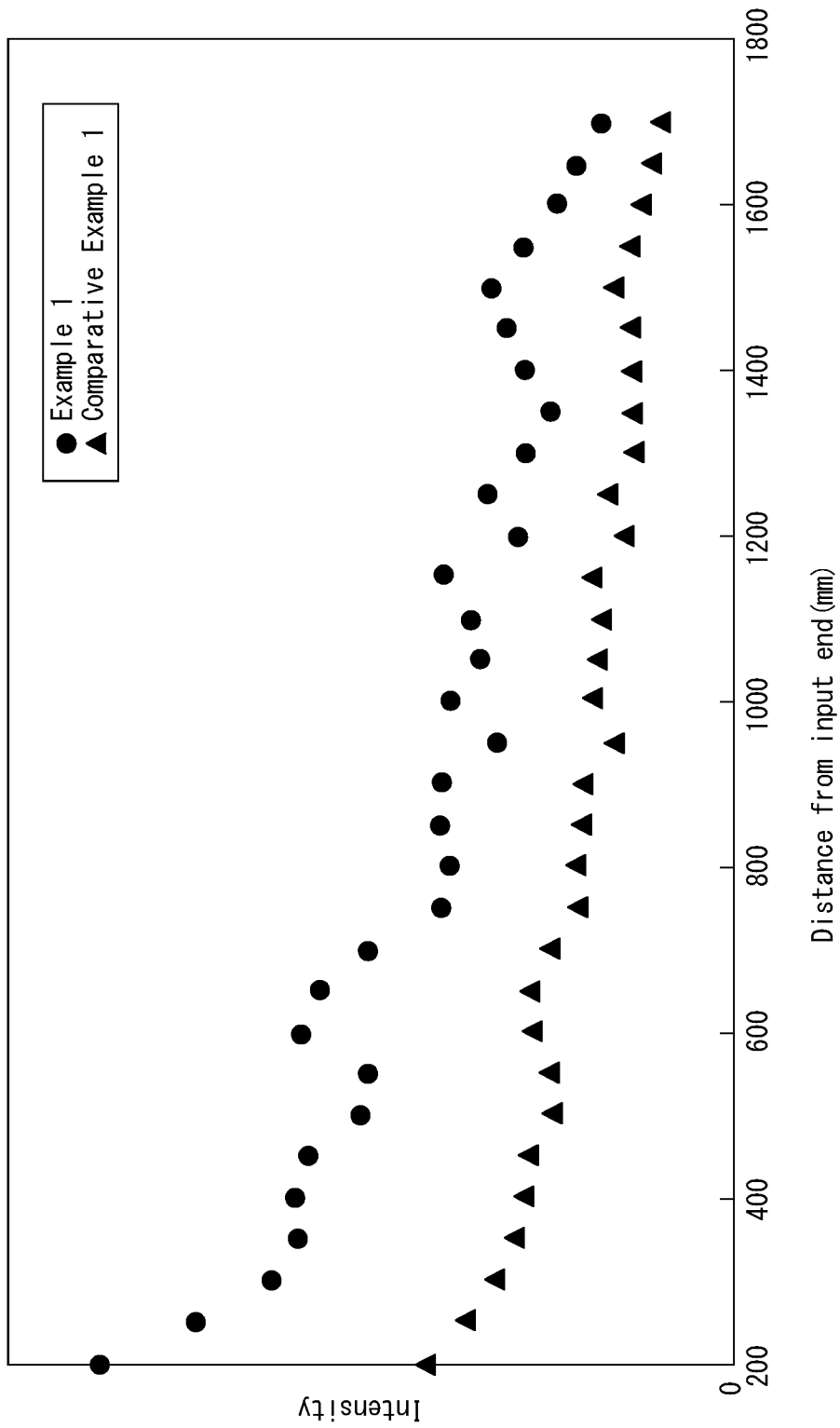
FIG. 7 is a diagram illustrating the change in the amount of light emitted from the side surface depending on the angle of incidence of light.

FIG. 7 is a diagram illustrating the change in the amount of light emitted from the side surface depending on the angle of incidence of light. Example 1 was an example of the optical fiber illumination device 1 according to this embodiment and had a structure described with reference to FIG. 1 to FIG. 4. Further, in Example 1, the distance d between the LED being the light source 200 and the first end 102 of the optical fiber bundle 10 was less than 0.5 mm. The optical fibers 11 had an angular aperture 2θ of 120° and a numerical aperture NA of 0.87. The second light input portion 20-2 in Example 1 was the same as the first light input portion 20-1. In this experiment, the switch 203 of the first light input portion 20-1 was turned ON so that the side surface of the optical fiber bundle 10 would emit light using one light source 200. The intensity of the emitted light was measured at intervals of 50 mm over a distance L of 1700 mm from the first end 102 of the optical fiber bundle 10. In this case, the distance h to the measurement position was 1.0 mm. Further, since the light emitting portion of the optical fiber bundle 10 extended from a position 200 mm from the first end 102, the initial measurement was started at this position.

Comparative Example 1 used a light source 200 different from one in Example 1. Comparative Example 1 used an LED light source unit (LS-L150 manufactured by SUMITA OPTICAL GLASS, Inc.) as the light source 200 instead of the LED fixed by the casing 202. The LED light source unit used in Comparative Example 1 concentrates light emitted from an LED using a lens and projected light into the optical fiber bundle 10. Accordingly, the angle of incidence θi on the optical fiber bundle 10 was θ or less. Therefore, the angle 20i that was twice the angle of incidence was equal to or smaller than the angular aperture 2θ. The distance d in Comparative Example 1 (in this case, the distance between the focal point of the lens and the first end 102 as described above) was 0.5 mm or less. The amount of light from the light source in each of Example 1 and Comparative Example 1 was controlled such that the same amount of light would enter the optical fiber bundles 10 in the examples. The other conditions were the same as those for Example 1.

The horizontal axis in FIG. 7 represents the measurement position using the distance L from the first end 102. Further, the vertical axis in FIG. 7 represents the measured intensity of the emitted light. As illustrated in FIG. 7, for any distance L, the intensity of light emitted in Example 1 was higher than that in Comparative Example 1. Specifically, FIG. 7 demonstrates that in Example 1 that was a structure in which light in a range of angles wider than the angular aperture 2θ was emitted toward the optical fiber bundle 10, the amount of light emitted from the side surface was improved more than in Comparative Example 1, and thus Example 1 is suitable for use in lighting applications. Leakage of light in a range of angles wider than the angular aperture 2θ inside the optical fiber bundle 10 may have contributed to the increase in the intensity of the emitted light.

Figure 8:
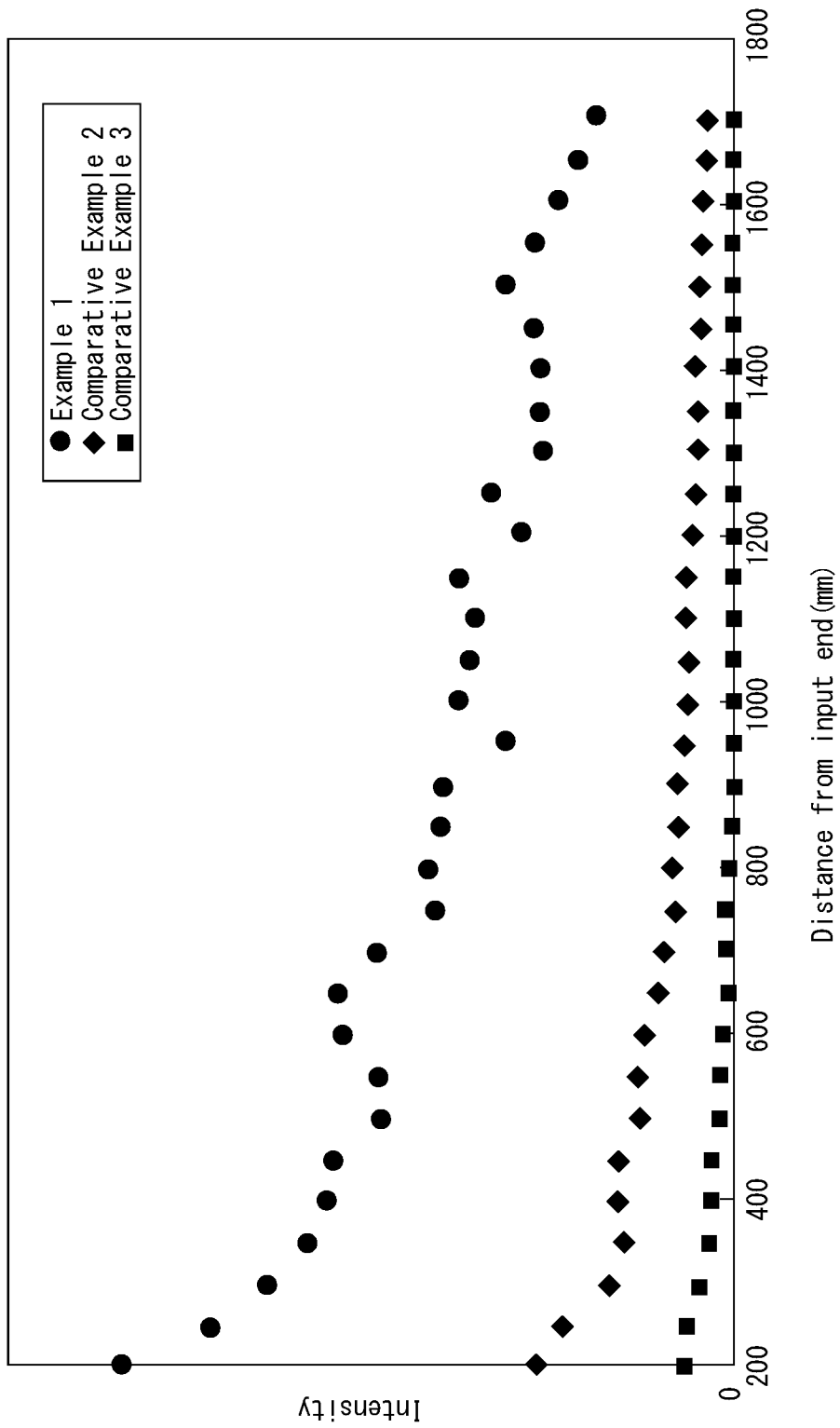
FIG. 8 is a diagram illustrating the change in the amount of light emitted from the side surface depending on the numerical aperture of optical fibers.

FIG. 8 is a diagram illustrating the change in the amount of light emitted from the side surface depending on the numerical aperture NA of the optical fibers 11. In view of the practical utility of lightings, an experiment of changing the kind of the plurality of optical fibers 11 included in the optical fiber bundle 10 was performed aside from the experiment illustrated in FIG. 7. The horizontal axis and the vertical axis in FIG. 8 are the same as those in FIG. 7.

Example 1 was as described for the experiment illustrated in FIG. 7. In Comparative Example 2, the optical fibers 11 had an angular aperture 2θ of 70° and a numerical aperture NA of 0.57. In Comparative Example 3, the optical fibers 11 had an angular aperture 2θ of 15° and a numerical aperture NA of 0.13. Comparative Example 2 and Comparative Example 3 were the same as Example 1 except for the kind of the optical fibers 11.

Figure 9:
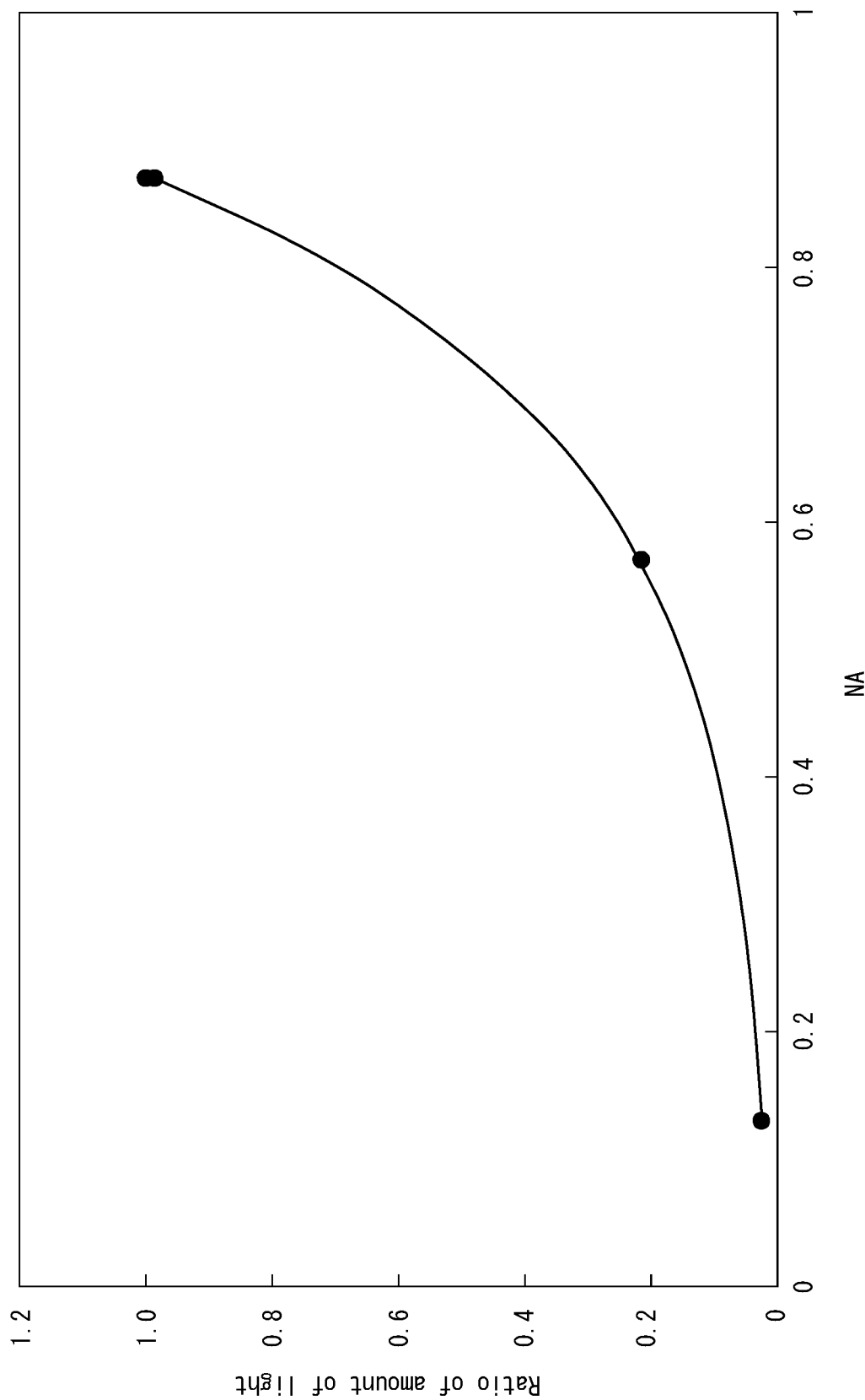
FIG. 9 is a diagram illustrating the relationship between the numerical aperture of optical fibers and the ratio of the amount of light.

As illustrated in FIG. 8, for any measurement position, the intensities of the light emitted in Example 1, Comparative Example 2, and Comparative Example 3 were in descending order. Accordingly, FIG. 8 demonstrates that a larger numerical aperture NA improves the amount of light emitted from the side surface, and is more suitable for lighting applications. When the numerical aperture NA was small, much of light may have leaked out near the first end 102 without reaching the light emitting portion due to a low angular aperture 2θ, which may have reduced the amount of light emitted from the side surface. FIG. 9 is a diagram illustrating the relationship between the numerical aperture NA of optical fibers and the ratio of the amount of light. The horizontal axis in FIG. 9 represents the numerical aperture NA. The vertical axis in FIG. 9 represents the ratio of the amount of light indicating the relative change in the amount of light emitted from the side surface. The vertical axis represents a proportion such that the numerical aperture NA of the optical fibers 11 in Example 1 was 1. As illustrated in FIG. 9, when the numerical aperture NA was 0.75, the ratio of the amount of light was approximately 0.5. Further, when the numerical aperture NA was 0.60, the ratio of the amount of light was approximately 0.25.

Now, for example, an optical fiber illumination device 1 having a light emitting side surface with a length of 5 m or less preferably has an emission intensity of at least approximately 5 µW at a distance L of 1 m from the first end 102 in terms of practicality. The distance h to the measurement position in this case is 1.0 mm. Example 1 had an emission intensity twice or more higher than 5 µW at a distance L of 1 m from the first end 102. On the other hand, in Comparative Example 2 and Comparative Example 3, the emission intensity at a distance of 1 m from the first end 102 was lower than 5 µW. Further, when the numerical aperture NA was 0.75, the ratio of the ratio of the amount of light with respect to that in Example 1 was approximately 0.5 as in FIG. 9, an emission intensity of approximately 5 µW was obtained at a distance L of 1 m from the first end 102. Accordingly, the numerical aperture NA of the plurality of optical fibers 11 is preferably 0.75 or more. The numerical aperture NA of the plurality of optical fibers 11 is more preferably 0.80 or more. The numerical aperture NA of the plurality of optical fibers 11 is still more preferably 0.85 or more. When the plurality of optical fibers 11 include different kinds of optical fibers 11, the average numerical aperture NA of the plurality of optical fibers 11 is preferably 0.75 or more. Further, the numerical aperture NA of each of the plurality of optical fibers 11 is more preferably 0.75 or more.

It should be noted that while embodiments have been described above in conjunction with the drawings and examples, those skilled in the art can readily implement various changes and modifications based on the present disclosure. It should therefore be noted that those changes or modifications are included in the scope of the present disclosure. The components, functions, etc. can be rearranged in a manner such that no logical inconsistency arises; for example, a plurality of components etc. may be combined into one or one component etc. may be divided.

For example, in the above embodiments, the first light input portion 20-1 is described as one component. Further, the second light input portion 20-2 is described as one component. However, in the optical fiber illumination device 1 of the present disclosure, at least one of the first light input portion 20-1 and the second light input portion 20-2 may be constituted by a plurality of light input portions, each being identical to the relevant light input portion.

Figure 10:
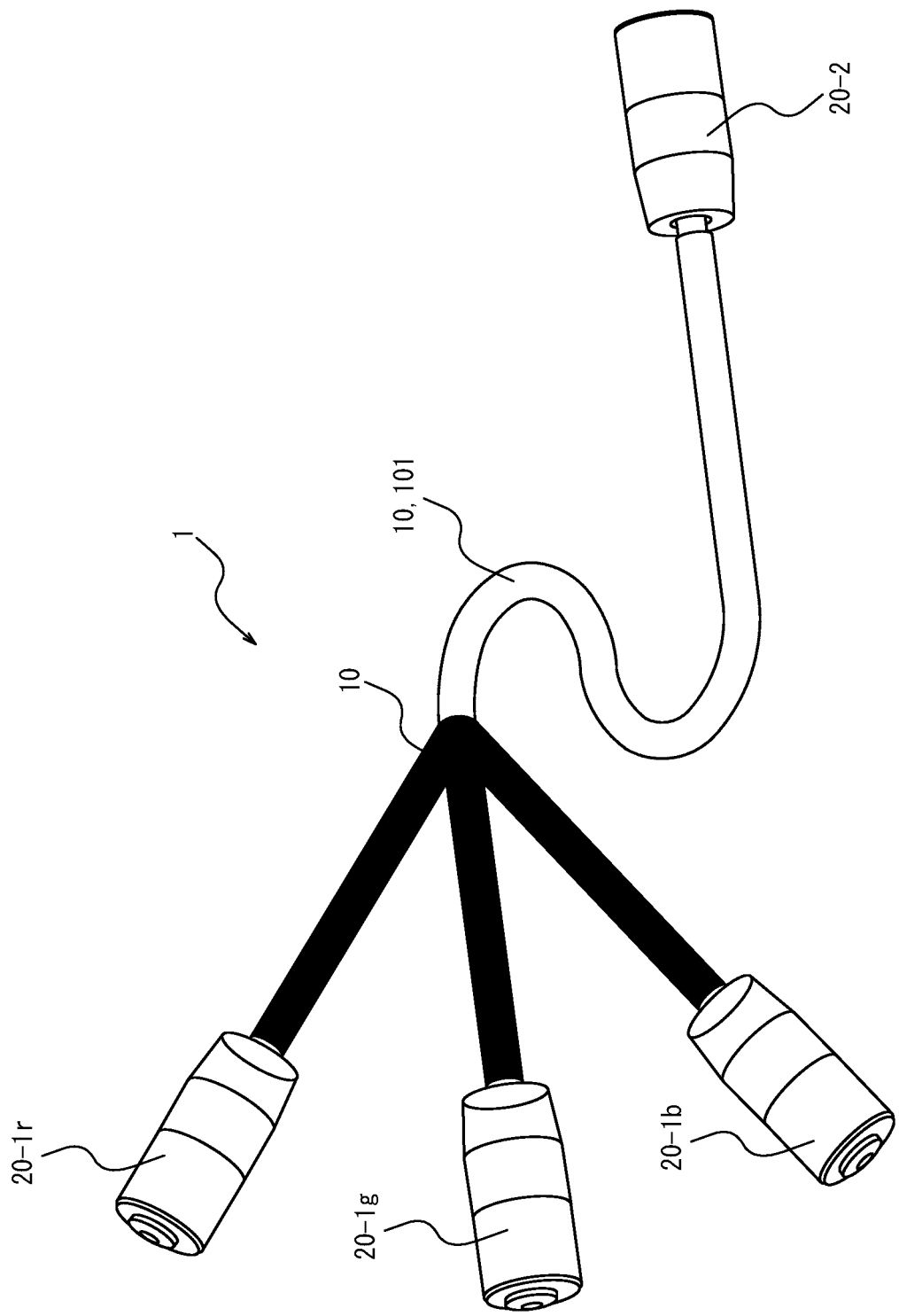
FIG. 10 is a diagram illustrating the appearance of an optical fiber illumination device according to a variation.

FIG. 10 is a diagram illustrating the appearance of an optical fiber illumination device 1 according to a variation. The optical fiber illumination device 1 of this variation include a first light input portion for red 20-1r, a first light input portion for green 20-1g, and a first light input portion for blue 20-1b. The first light input portions 20-1 have respective first light sources 200-1 for red, yellow, and blue. Accordingly, the optical fiber illumination device 1 of this variation has a plurality of first light sources 200-1. In the optical fiber bundle 10, the plurality optical fibers 11 are divided at a branch point into ones for red, yellow, and blue, and each branch has a first end 102. The plurality of first light sources 200-1 are placed close to the respective plurality of first ends 102 obtained by the division. When a user turns ON for example a switch 203 of the first light input portion for red 20-1r of the optical fiber illumination device 1 according to this variation, the part of the optical fiber bundle 10 that is not divided, namely the light emitting portion covered with the resin jacket 101 emits red light.

Figure 11:
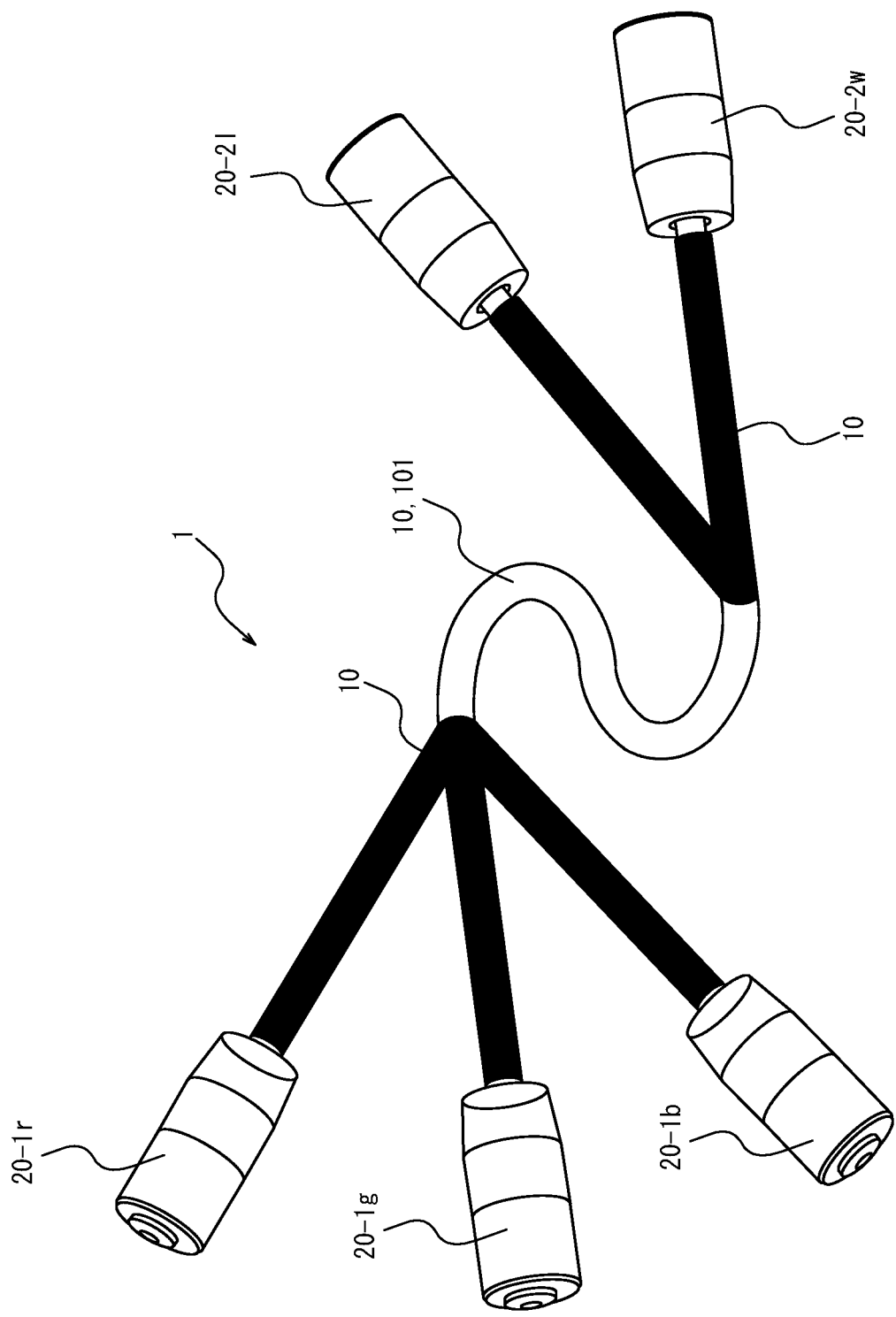
FIG. 11 is a diagram illustrating the appearance of an optical fiber illumination device according to another variation.

FIG. 11 is a diagram illustrating the appearance of an optical fiber illumination device 1 according to another variation. First light input portions 20 of the optical fiber illumination device 1 according to this variation are the same as those in the optical fiber illumination device 1 according to the variation illustrated in FIG. 10. Further, the optical fiber illumination device 1 of this variation includes a second light input portion for neutral white 20-2w and a second light input portion for incandescent color 20-21. The second light input portions 20-2 have respective second light sources 200-2 for neutral white and incandescent color. Thus, the optical fiber illumination device 1 of this variation has more than one second light sources 200-2. In the optical fiber bundle 10, the plurality optical fibers 11 are divided at a branch point into ones for neutral white and incandescent color, and each branch has a second end. The plurality of second light sources 200-2 are placed close to the respective plurality of second ends obtained by the division. When a user turns ON for example a switch 203 of the second light input portion for incandescent color 20-21 of the optical fiber illumination device 1 according to this variation, the part of the optical fiber bundle 10 that is not divided, namely the light emitting portion covered with the resin jacket 101 emits light of incandescent color. The optical fiber illumination devices 1 according to the variations illustrated in FIG. 10 and FIG. 11 are suitable for decorative purposes, since a user can change the emission colors of the devices.

In the present disclosure, for example, "first" and "second" are identifiers for distinguishing relevant features. The reference numerals of the features distinguished using for example "first" and "second" in the present disclosure are interchangeable. The interchange between the identifiers is performed at a time. The features of which identifiers have been interchanged are still distinguished. The identifiers may be removed. The features from which identifiers have been removed are distinguished using reference numerals. The identifiers such as "first" and "second" in the present disclosure must not be used to construe the order of the relevant features or to expect the existence of a component denoted by an identifier having a smaller ordinal number.

INDUSTRIAL APPLICABILITY

The optical fiber illumination device 1 of the present disclosure can be used, for example, for night lighting, decorative illumination, or lighting for determining the position or the state of an object provided with the device in various fields such as the industrial field and the field of decoration. The optical fiber illumination device 1 according to the present disclosure can suitably be used especially as a guide display or an interior or exterior light of a vehicle.

REFERENCE SIGNS LIST

1: Optical fiber illumination device
10: Optical fiber bundle
11: Optical fiber
11a: Core
11b: Cladding
20-1: First light input portion
20-2: Second light input portion
100: Buffer
101: Resin jacket
102: First end
200: Light source
200-1: First light source
200-2: Second light source
201: Light guide
202: Casing
203: Switch

The invention claimed is:

1. An optical fiber illumination device comprising:
an optical fiber bundle having a plurality of optical fibers, a resin jacket that covers a bundle of the plurality of optical fibers and emits light, a first end, and a second end, the first end and the second end being polished;
a first light source placed close to the first end being free of a condenser lens therebetween so as to emit light in a range of angles larger than an angular aperture of the plurality of optical fibers toward the optical fiber bundle; and
a second light source placed close to the second end being free of a condenser lens therebetween so as to emit light in a range of angles larger than the angular aperture of the plurality of optical fibers toward the optical fiber bundle.

2. The optical fiber illumination device according to claim 1, wherein the first light source comprises a plurality of first light sources, and
each of the plurality of the first light sources is placed close to each of the plurality of divided first ends.

3. The optical fiber illumination device according to claim 1,
wherein the second light source comprises a plurality of second light sources, and
each of the plurality of the second light sources is placed close to each of the plurality of divided second ends.

4. The optical fiber illumination device according to claim 1, wherein a numerical aperture of the plurality of optical fibers is 0.75 or more.

5. The optical fiber illumination device according to claim 1, wherein a numerical aperture of the plurality of optical fibers is 0.80 or more.

6. The optical fiber illumination device according to claim 1, wherein a numerical aperture of the plurality of optical fibers is 0.85 or more.

* * * * *